(12) United States Patent
Schwab

(10) Patent No.: US 7,404,688 B2
(45) Date of Patent: Jul. 29, 2008

(54) RELEASABLE FASTENING DEVICE

(75) Inventor: Leo F. Schwab, Fraser, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/743,835

(22) Filed: May 3, 2007

(65) Prior Publication Data

US 2007/0284897 A1    Dec. 13, 2007

Related U.S. Application Data

(62) Division of application No. 10/789,543, filed on Feb. 27, 2004, now abandoned.

(51) Int. Cl.
*B60Q 1/00* (2006.01)

(52) U.S. Cl. .................. 403/329; 362/505; 362/549

(58) Field of Classification Search .............. 403/326, 403/329, 397, DIG. 14; 411/508; 24/460; 362/549, 267, 505, 507; 293/102, 117, 155; 248/220.43

See application file for complete search history.

(56) References Cited

U.S. PATENT DOCUMENTS

| | | | | |
|---|---|---|---|---|
| 4,318,158 A | * | 3/1982 | Livermore et al. | 362/29 |
| 4,569,007 A | * | 2/1986 | Dick | 362/294 |
| 4,696,128 A | * | 9/1987 | Fukuhara | 49/492.1 |
| 4,722,032 A | * | 1/1988 | Kulka | 362/549 |
| 5,101,540 A | * | 4/1992 | Roof et al. | 24/458 |
| 5,363,537 A | * | 11/1994 | Schneider et al. | 24/289 |
| 5,448,454 A | * | 9/1995 | Nonaka | 362/546 |
| 5,562,338 A | * | 10/1996 | Yamamoto | 362/521 |
| 5,598,611 A | * | 2/1997 | Yamada et al. | 24/581.1 |
| 5,702,148 A | * | 12/1997 | Vaughan et al. | 296/146.9 |
| 5,702,174 A | * | 12/1997 | Dobler | 362/496 |
| 5,740,640 A | * | 4/1998 | Yasuda | 52/204.597 |
| 5,975,729 A | * | 11/1999 | Dobler et al. | 362/507 |
| 6,061,882 A | * | 5/2000 | Otte-Wiese | 24/487 |
| 6,164,807 A | * | 12/2000 | Gerstner et al. | 362/549 |
| 6,502,974 B2 | * | 1/2003 | Chase et al. | 362/549 |
| 6,698,808 B2 | * | 3/2004 | Burkhardt et al. | 293/102 |

* cited by examiner

*Primary Examiner*—Daniel P. Stodola
*Assistant Examiner*—Joshua T Kennedy

(57) ABSTRACT

An assembly having a device for releasably fastening a first component to a second component includes a device body, a first fastener extending from the device body and operable to attach the device body to the first component, and a second fastener extending from the device body and adapted to attach the device to the second component. When a force of greater than a predetermined amount is applied to the second component, the first fastener detaches from the first component without damaging the first component. Preferably, the first component is a vehicle headlamp or taillamp assembly and the second component is a bumper fascia. The first and second fasteners of the device body accurately position the fascia relative to the headlamp assembly and securely hold the fascia at a location near a lamp lens.

17 Claims, 2 Drawing Sheets

RELEASABLE FASTENING DEVICE

CROSS REFERENCE TO RELATED APPLICATIONS

This application is a divisional of and claims the benefit of U.S. nonprovisional patent application Ser. No. 10/789,543, filed Feb. 27, 2004, now abandoned, which is incorporated herein by reference.

BACKGROUND OF THE INVENTION

The present invention relates generally to fastening devices and, in particular, to a releasable fastening device for automotive vehicle components, such as vehicle trim components.

Vehicle trim components, such as fascias mounted adjacent to headlamp and taillamp assemblies are well known. Gaps and flushness requirements on vehicles between the fascia and the headlamp and taillamp assemblies on future vehicles are being reduced. As a result, the dimensional variation between the fascia and the lamp assembly needs to be controlled much more accurately. Prior art means of controlling this variation have resorted to using support brackets that hold the top surface of the fascia relative to the headlamp and taillamp lens. These designs, however, allow the high loads imparted into a fascia from a bumper impact to be absorbed into the body structure of the vehicle. If the fascia is mounted directly to the lamp housing, the impact loading disadvantageously breaks the lamp housing and lens, causing a great deal of damage for a fairly small impact load.

It is desirable, therefore, to provide a device and/or a method for releaseably fastening a fascia to a headlamp or a taillamp housing while letting it release during a bumper impact rather than transfer high loads to the housing and lens.

SUMMARY OF THE INVENTION

The present invention concerns an assembly having a device for releasably fastening a first component to a second component. The device includes a device body, a first fastener extending from the device body and operable to attach the device body to the first component and a second fastener extending from the device body and adapted to attach the device to the second component. When a force of greater than a predetermined amount is applied to the second component, the first fastener detaches from the first component without damaging the first component.

Preferably, the first component is a vehicle headlamp or taillamp assembly and the second component is a vehicle bumper fascia. Preferably, the device body attaches to the first and second components by snap-fit connections with the first and second fasteners. The device in accordance with the present invention holds the top surface of the fascia housing relative to the lamp lens but upon high bumper impact loading, the device snaps away from the lamp assembly. The snap features are designed so that after the high bumper impact load, the snap feature of the device will allow it to be snapped back into place without damage to the device or the lamp assembly or the fascia. In addition, the device can more accurately control the fascia to lamp assembly dimensions because it is connected directly to the lamp housing under the lens.

BRIEF DESCRIPTION OF THE DRAWINGS

The above as well as other advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
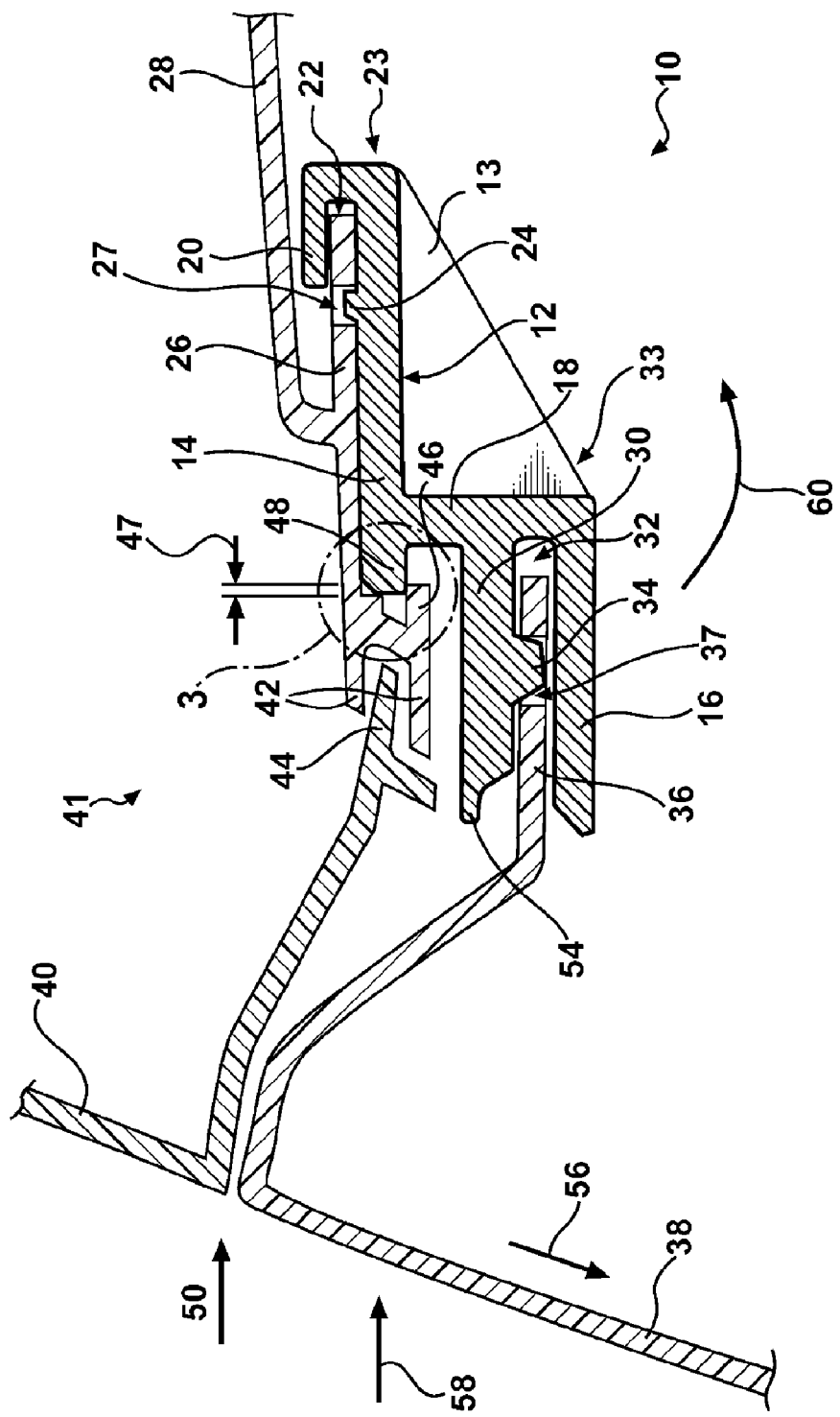
FIG. 1 is a fragmentary cross-sectional view of a releasable fastening device in accordance with the present invention shown attached to a lamp housing and a bumper fascia.
Figure 3:
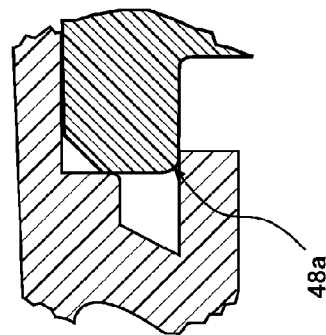
FIG. 3 is a cross-sectional view, on an enlarged scale, of the encircled portion 3 of FIG. 1.
Figure 2:
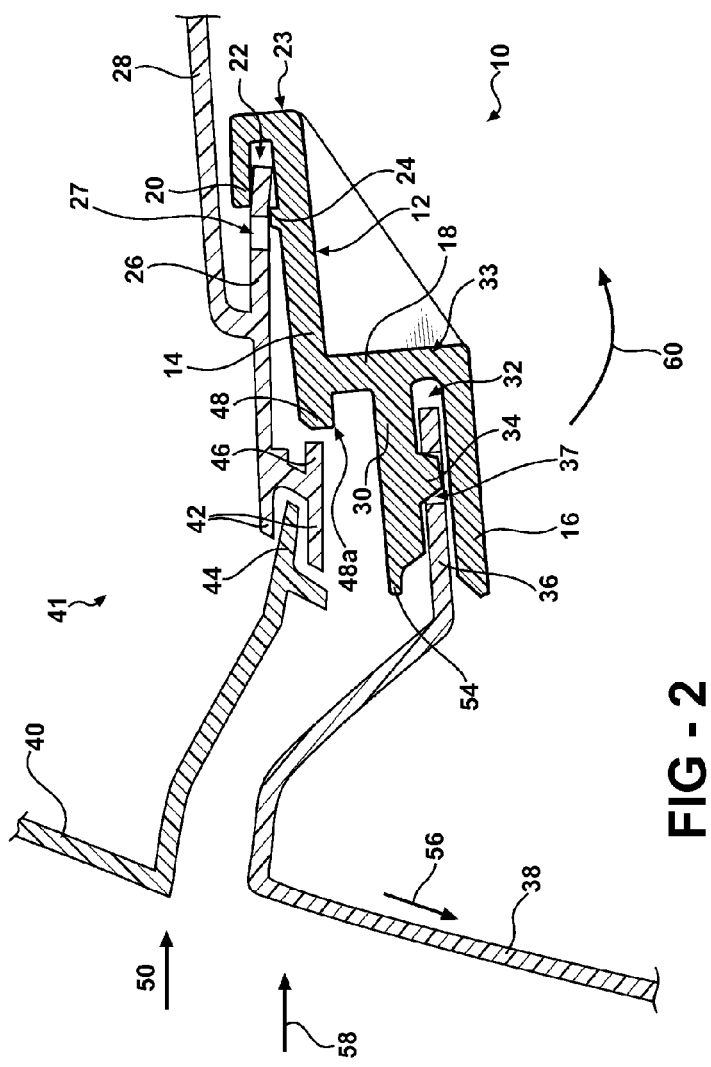
FIG. 2 is a fragmentary cross-sectional view of the releasable fastening device of FIG. 1 shown detached from the housing.

Referring now to FIGS. 1-3, a device for releasably attaching a first component to a second component in accordance with the present invention is indicated generally at 10. The device 10 includes a device body 12 having an upper arm 14 and a lower arm 16 connected by an intermediate arm 18 and extending in opposite directions therefrom. The upper arm 14 includes a return flange 20 extending from a free end thereof that defines a channel 22 between respective inner surfaces of the return flange 20 and the upper arm 14. The upper arm 14, the return flange 20, and the channel 22 define a first fastener, indicated generally at 23. A projection 24 extends upwardly from the inner surface of the upper arm 14. Preferably, the projection 24 is ramped on a leading edge thereof to facilitate attachment to a flange 26 of a first component, such as a housing 28, discussed in more detail below. Preferably, the device body 12 is formed of an acetyl material, a polypropylene material, a plastic material, or another material having similar properties. A rib 13 extends between the upper arm 14 and the intermediate arm 18 to provide support to the device body 12. Alternatively, the first component 28 is a taillamp housing.

An attachment arm 30 extends from the intermediate arm 18 from a location between the upper arm 14 and the lower arm 16 and in the same direction as the lower arm 16, defining a channel 32 between respective interior surfaces of the attachment arm 30 and the lower arm 16. The lower arm 14, the attachment arm 30, and the channel 32 define a second fastener, indicated generally at 33. A projection 34 extends downwardly from an inner surface of the attachment arm 30. Preferably, the projection 34 is ramped on a leading edge thereof to facilitate attachment to a flange 36 of a second component 38, discussed in more detail below. The second component 38 is preferably a vehicle bumper fascia.

The flange 26 includes an aperture 27 formed therein and the flange 36 includes an aperture 37 formed therein. The interior surface defined by the aperture 27 cooperates with the projection 24 of the upper arm 14 when the device body 12 is attached thereto, discussed in more detail below. The interior surface defined by the aperture 37 cooperates with the projection 34 of the attachment arm 30 when the device body 12 is attached thereto, discussed in more detail below.

The housing 28 is adapted to receive a first component such as a vehicle headlamp lens 40. Alternatively, the first component 40 is a vehicle taillamp lens. The housing 28 and the lens 40 form a lamp assembly, indicated generally at 41. A pair of flanges 42 of the housing 28 is operable to attach to a corresponding flange 44 of the lens 40. Alternatively, the housing 28 is attached to the lens 40 in any suitable manner to form the assembly 41. A finger 46 extends from the housing 28 in an opposite direction from the flanges 42 to engage with an end 48 of the upper arm 14 opposite the return flange 20 when the device body 12 is attached thereto. The end 48 of the upper arm 14 includes a corner shaped by a radius 48a, best seen in FIG. 3, that engages with the finger 46 of the housing 28.

During assembly of the device 10, the device body 12 is attached to the fascia 38 by pressing the flange 36 into the channel 32 at the second fastener 33. The free end of the flange 36 engages with the projection 34, deflecting the flange 30 upwardly and, as the flange 36 continues into the channel 32, the projection 34 engages in the aperture 37, releasably securing the flange 36 in place in the channel 32 and attaching the device body 12 to the fascia 38 via a snap-fit.

After the flange 36 has been pressed into the channel 32, the flange 26 is pressed into the channel 22 at the first fastener 23. Alternatively, the flange 26 is pressed into the channel 22 prior to the flange 36 being pressed into the channel 32. Alternatively, concurrent with the flange 36 being pressed into the channel 32, the flange 26 is pressed into the channel 22. The free end of the flange 26 engages with the projection 24, deflecting the flange 26 upwardly and, as the flange 26 continues into the channel 22, the projection 24 engages in the aperture 27, releasably securing the flange 26 in place in the channel 22 and attaching the device body 12 to the housing 28 via a snap-fit. An upper surface of the finger 46 engages with a lower surface of the end 48 of the upper arm 14. The engaging surfaces of the finger 46 and the end 48 of the upper arm 14 overlap by a distance indicated by an arrow 47. Preferably, a groove (not shown) is molded in the housing 28 adjacent the finger 46 that facilitates attaching the end 48 of the upper arm 14 to the housing 28. The overlap 47 and the radius 48a may be varied depending on the detachment requirements of the device 10, discussed in more detail below. The projection 34 extends from the lower surface of the arm 30 for a greater distance that the distance that the projection 24 extends from the upper surface of the arm 14. The force required to dislodge or release the projection 24 of the upper arm 14 from the flange 26, therefore, is much less than the force required to dislodge or release the projection 34 of the attachment arm 30 from the flange 36.

Because the device body 12 is attached to both the flange 26 of the housing 28 and to the flange 36 of the fascia 38, the device body 12 secures the fascia 38 to the headlamp assembly 41. The fascia 38 and the headlamp assembly 41, when attached, therefore, define a gap 50 between the lens 40 and the fascia 38. The device body 12, therefore, accurately positions the fascia 38 relative to the headlamp assembly 41 and securely holds the fascia 38 at a location near the lens 40.

The attachment arm 30 of the device body 12 may be removed from the flange 36 by placing a tool, such as a screwdriver or the like (not shown), on the lower surface of a projection 54 extending outwardly from a free end of the attachment arm 30. Preferably, the tool is placed on the lower surface of the projection 54 by moving the flange 36 in a downward direction indicated by an arrow 56, which widens the gap 50 and allows the tool to be placed adjacent to the projection 54. The projection 54 provides a surface for lifting the arm 30 whereby the projection 34 on the lower surface of the arm 30 can be lifted away from the aperture 37, and the arms 16, 18, and 30 may be moved away from the flange 36, which allows for removal of the fascia 38 from the device body 12 upon disassembly of the fascia 38, the device body 12, the lens 40, and the lamp housing 28 for vehicle repair.

When a force is applied to the fascia 38 in a direction indicated by an arrow 58, (such as during a bumper impact or the like) the fascia 38 and the flange 36 transmit the force to the device body 12 through the arms 16 and 30 and the projection 34. The device body 12 reacts to the force by moving in a direction indicated by an arrow 60. If the force applied to the fascia 38 is less than a predetermined amount, the end 48 of the upper arm 14 remains overlapped on the finger 46 and the projection 24 remains in the aperture 27. If the force applied to the fascia 38 is greater than the predetermined amount, the end 48 moves away from the flange 46 and the projection 24 is forced out of the aperture 27, removing the upper arm 14 from the flange 26 of the housing 28, best seen in FIG. 2. Because the end 48 moves away from the finger 46 and/or the arm 14 releases from the flange 26 after a force of the predetermined amount has been applied to the fascia 38, the excess force is not transferred to the lamp housing 28 or, more importantly, to the headlamp assembly 41. The headlamp assembly 41, therefore, remains intact and undamaged when a force is applied to the fascia 38, advantageously reducing the amount of potential repair and/or replacement costs after the force has been applied. After the event has taken place, the device body 12 can be reattached to the housing 28.

The predetermined amount of force applied to the fascia 38 that will separate the end 48 of the arm 14 from the finger 46 and/or the projection 24 from the flange 26 may be tuned by varying the profile of the projection 24, by varying the length of the projection 24, by varying the amount of overlap 47 between the end 48 of the arm 14 and the finger 46, and by varying the radius 48a. For example, the radius 48a can be varied to allow the tuning of the load to occur so that there is no damage imparted to the headlamp assembly 41 or to the fascia 38 when the end 48 releases but also allows the device 10 to hold the fascia 38 relative to the headlamp assembly 41 under normal or low speed impacts.

The device 10 in accordance with the present invention can be advantageously tuned depending on a desired functionality. For example, if it is desired that the fascia 38 must absorb a predetermined load but not release from the headlamp assembly 41, the radius 48a may be tuned to provide this desired functionality. Similarly, if it is desired that the fascia 38 must absorb a predetermined load and release from but not break the headlamp assembly 41, the radius 48a may also be tuned to provide this desired functionality. Thus with the same device 10 each or both of the desired functions may be met by merely tuning the radius 48a on the end 48 of the arm 14 while remaining within the scope of the present invention.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An assembly comprising:
    a bumper fascia including a fascia flange;
    a lamp assembly mounted adjacent to the bumper fascia and including a lamp flange having an end and a finger spaced from and defining a recess with the lamp flange; and
    a device including an intermediate arm; an upper arm extending from the intermediate arm in a non-parallel direction and including a first end, an opposed second end, a first fastener located adjacent to the first end and adjacent to the end of the lamp flange and having a projection releasably secured in an aperture of the lamp flange, and a radius on the second end that extends into the recess and is in releasable engagement with the finger; and a second fastener including an attachment arm extending from the intermediate arm and having a projection secured in an aperture of the lamp flange;

whereby when a force less than a predetermined amount is applied to the bumper fascia, the bumper fascia, the lamp assembly and the device will remain secured together, and when a force greater than the predetermined amount is applied to the bumper fascia, in a predetermined direction, the radius will release from the finger and the device will disengage from the lamp assembly.

2. The assembly of claim 1 wherein the device includes a lower arm extending from the intermediate arm and spaced from the upper arm and the attachment arm, the lower arm and the attachment arm define a channel therebetween, the second fastener includes a projection extending from the attachment arm toward the lower arm, the fascia flange includes an aperture, and the projection is releasably engaged in the aperture for releasably securing the second fastener to the fascia flange.

3. The assembly of claim 1 wherein the lamp assembly includes a lens and a housing, the lens being located adjacent to the bumper fascia, and the lamp flange and the finger extending from the housing.

4. The assembly of claim 1 wherein the lamp flange includes an aperture and the upper arm includes a projection extending therefrom that is releasably engaged with the aperture, and wherein the first fastener extends from the upper arm and includes a return flange extending parallel to and spaced from the upper flange to define a channel, the lamp flange releasably mounted in the channel.

5. The assembly of claim 1 wherein the upper arm is parallel to and secured against the lamp flange.

6. The assembly of claim 1 wherein the lamp assembly is a headlamp assembly.

7. The assembly of claim 1 wherein the lamp assembly is a tail lamp assembly.

8. An assembly for releasably fastening a lamp assembly to a bumper fascia, the assembly comprising:

the lamp assembly, including a lamp flange extending therefrom and a finger spaced from and defining a recess with the lamp flange;

the bumper fascia, including a fascia flange extending therefrom; and a device having an intermediate arm; an upper arm extending from the intermediate arm in a first direction that is non-parallel to the intermediate arm; a first fastener extending from the upper arm and including a return flange extending parallel to the upper arm, the upper arm and the return flange defining a first channel, the lamp flange releasably mounted in the first channel; a radius located opposite the first fastener extending into the recess and being in a releasable engagement with the finger; a lower arm extending from the intermediate arm in a second direction that is opposed to the first direction, the lower arm extending parallel to and spaced along the intermediate arm from the upper arm; and a second fastener including an attachment arm extending from the intermediate arm in the second direction parallel to and spaced from the lower arm, the attachment arm and the lower arm defining a second channel, the fascia flange mounted in the second channel;

whereby when a force less than a predetermined amount is applied to the bumper fascia, the bumper fascia, the lamp assembly and the device will remain secured together, and when a force greater than the predetermined amount is applied to the bumper fascia, in a predetermined direction, the radius will release from the finger and the device will disengage from the lamp assembly.

9. The assembly of claim 8 wherein the upper arm includes a first end and an opposed second end, and the return flange is located adjacent to the first end, and the second end includes a radius portion releasably engaged with a finger extending from the lamp assembly.

10. The assembly of claim 9 wherein the first fastener includes a projection extending from the upper arm that is releasably engaged with an aperture in the lamp flange.

11. The assembly of claim 8 wherein the first fastener includes a projection extending from the upper arm that is releasably engaged with an aperture in the lamp flange.

12. The assembly of claim 8 wherein the second fastener includes a projection extending from the attachment arm that is engaged with an aperture in the fascia flange.

13. The assembly of claim 8 wherein the device includes a rib supportably extending between the intermediate arm and the upper arm.

14. The assembly of claim 8 wherein the lamp assembly includes a housing and a lens, and the first fastener is releasably attached to the housing.

15. The assembly of claim 8 wherein the predetermined amount of force for allowing the first fastener to detach from the lamp assembly is variable by varying an amount of the overlap between the second end of the upper arm and the finger.

16. The assembly of claim 8 wherein the predetermined amount of force for allowing the first fastener to detach from the lamp assembly is variable by varying a size of the radius.

17. The assembly of claim 8 wherein the lamp assembly includes lamp flange having an aperture; the device body includes an upper arm secured against lamp flange; and the first fastener includes a projection extending from the upper arm into the aperture, and a return flange extending parallel to and spaced from the upper arm to define a channel within which the lamp flange is releasably secured.

* * * * *